No. 743,218. Patented November 3, 1903.

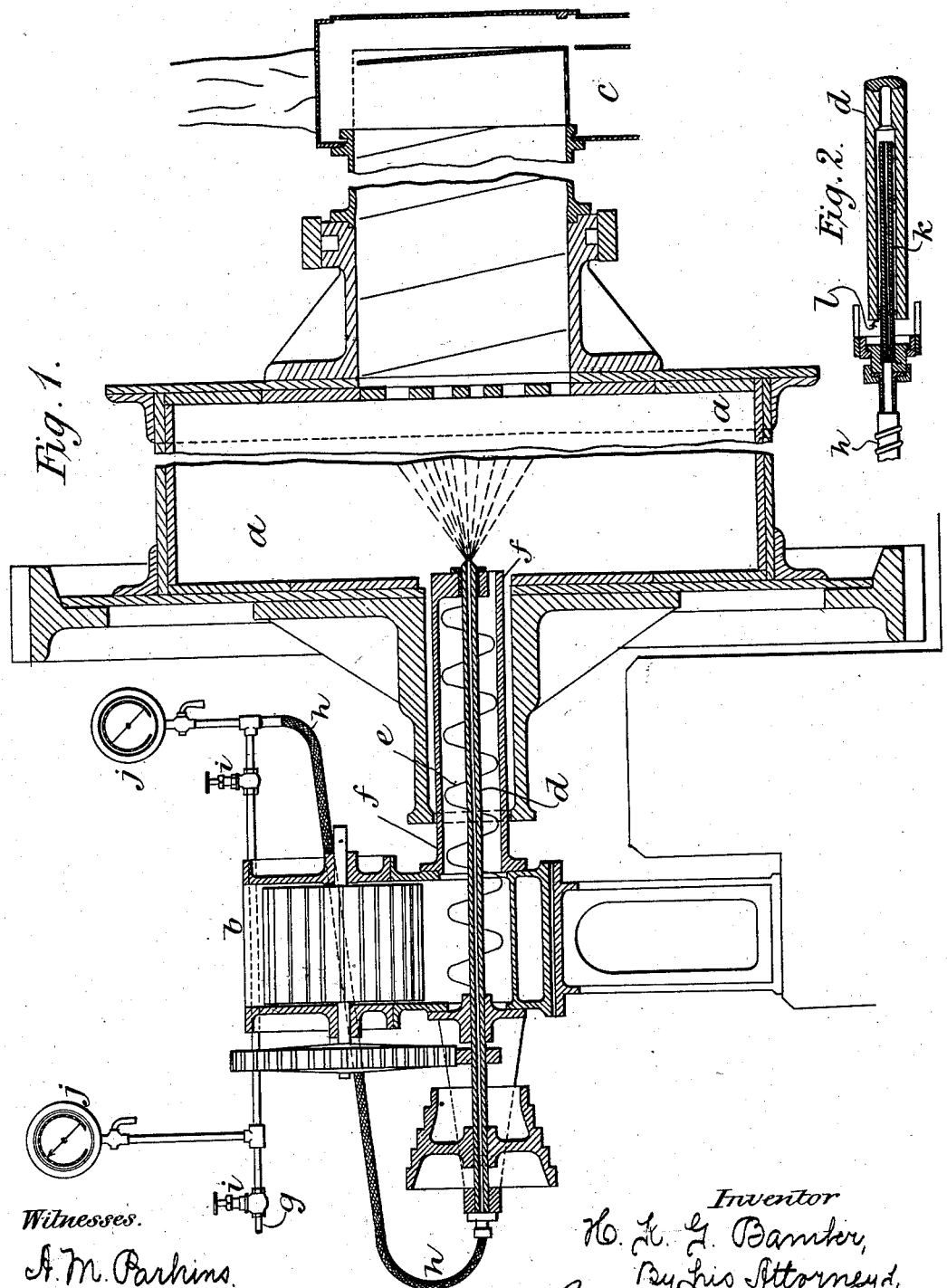

UNITED STATES PATENT OFFICE.

HENRY KELWAY GWYER BAMBER, OF GREENHITHE, ENGLAND.

MANUFACTURE OF PORTLAND CEMENT.

SPECIFICATION forming part of Letters Patent No. 743,218, dated November 3, 1903.

Application filed May 18, 1903. Serial No. 157,727. (No specimens.)

*To all whom it may concern:*

Be it known that I, HENRY KELWAY GWYER BAMBER, a manufacturer, a subject of the King of Great Britain, residing at Ingress House, Greenhithe, in the county of Kent, England, have invented certain new and useful Improvements in the Manufacture of Portland Cement, of which the following is a specification.

The object of this invention is to condition cement, thereby obviating the exposure of the cement to the action of the atmosphere, as is now the case, and to regulate the setting time thereof without the use of gypsum or other materials.

According to this invention steam which may be superheated is introduced into the tube-mill or other mill of that class in which the cement is ground. Some air may be allowed to enter the mill with the steam. The cement on being cooled is ready for the market.

The drawings illustrate an apparatus in which the process may be carried out.

Figure 1 is a longitudinal section, and Fig. 2 is an enlarged view, of the steam connection.

$a$ is the mill, having a feed-opening $b$ and a delivery $c$. A hollow spindle $d$, carrying the conveyer $e$, extends through the feed-pipe $f$ and is connected to the steam-supply pipe by the flexible pipe $h$. Regulating-valves $i$ and pressure-gages $j$ are provided for regulating the pressure of the steam, which varies according to the quality and quantity of the cement being treated. The steam passes from the flexible pipe $h$ to a pipe $k$, which enters the hollow spindle $d$, and, if desired, air may be introduced at $l$. (See Fig. 2.)

The coarsely-ground cement passes from the conveyer into the mill for finishing to the requisite fineness. If the coarse cement so passing has come from a rotary kiln, its setting time is probably very quick. This of course is tested from time to time. If from an ordinary kiln, its setting time will be slower, but still quicker than is wanted. The quantity passing into the mill varies slightly according as the coarse-grinders deliver more or less speedily. The cement in its finished state passing out from the mill is sampled repeatedly, perhaps every quarter of an hour, and the setting time ascertained. As the results of these tests more or less steam is introduced from time to time through the valves into the mill. If, for instance, the cement is found to be setting too quick or if the quantities that are passing in from the conveyer are increased for any reason, more steam would be admitted. On the other hand, if the quantities passing in become decreased or if the setting time is found to be slower than is required, less steam is admitted, so that the matter can be completely regulated.

By this process the steam does not come in contact with the cement until both are delivered into the interior of the tube-mill at a point where attrition from the rolling stones or balls with which the mill is charged is met with. By this process each particle of cement has its surfaces completely hydrated or aerated, these surfaces, by the attrition of the balls or pebbles reducing the particles of cement to greater fineness, are repeatedly removed, exposing fresh surfaces to become similarly hydrated or aerated until finally the cement leaves the mill, where it has been kept in frictional contact for a considerable period of time in the presence of the required quantity of steam, thoroughly hydrated or aerated, the amount of hydration or aeration given having a direct and permanent influence on the setting time of the cement so treated, the causticity of the small proportion of the loosely-combined silicates and aluminates of lime present being removed.

What I claim is—

1. The process of conditioning and regulating setting time of cement consisting in bringing steam in contact with the cement during grinding.

2. The process of conditioning and regulating the setting time of cement consisting in bringing steam in contact with the cement while the latter is being subjected to the final grinding operation.

HENRY KELWAY GWYER BAMBER.

Witnesses:
WM. P. BROWN,
ROB LEONARD.